J. O. GARRETT.
TRUCK BRAKE.
APPLICATION FILED JULY 3, 1919.
1,393,013.
Patented Oct. 11, 1921.
3 SHEETS—SHEET 2.
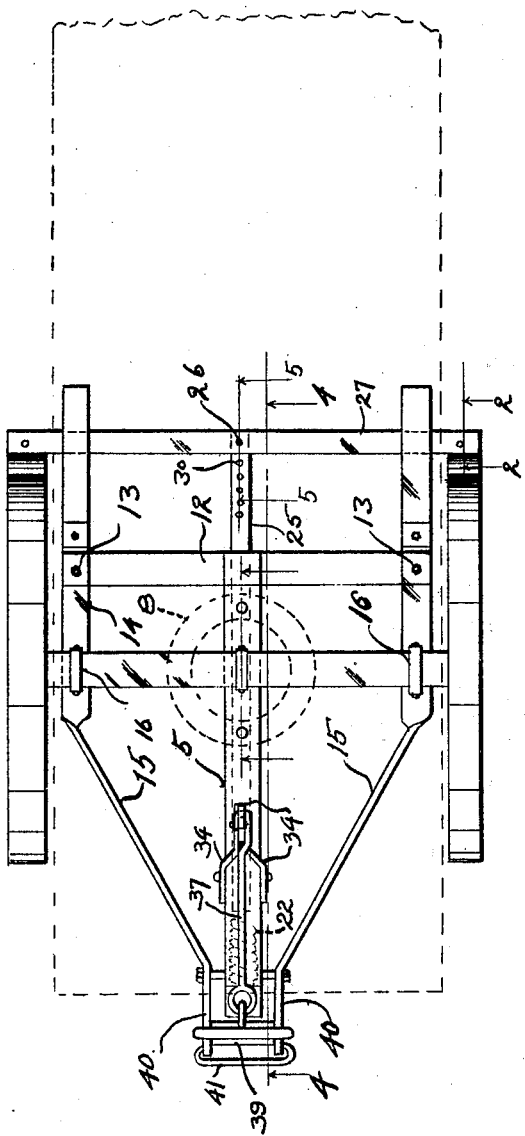
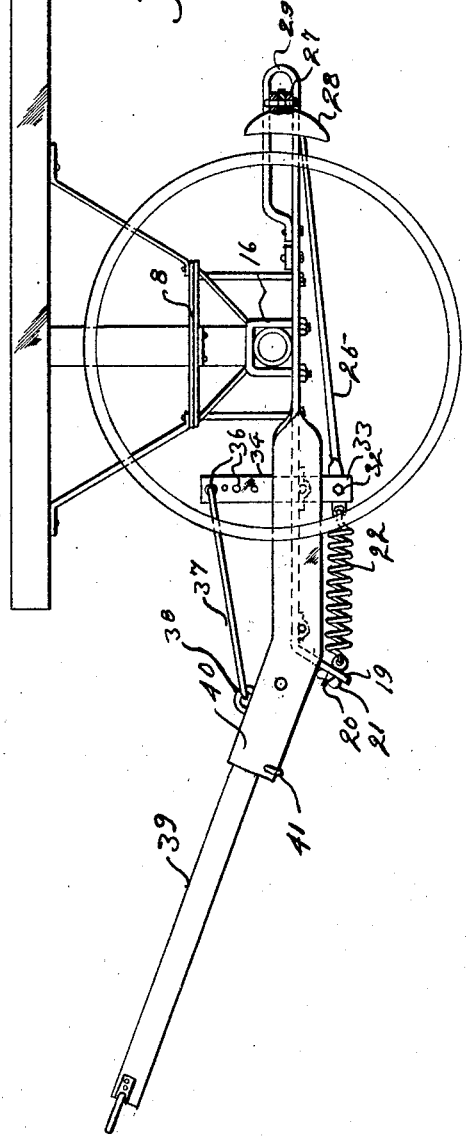
Inventor
James O. Garrett
By
Attorney J. O. GARRETT.
TRUCK BRAKE.
APPLICATION FILED JULY 3, 1919.
1,393,013.
Patented Oct. 11, 1921.
3 SHEETS—SHEET 3.
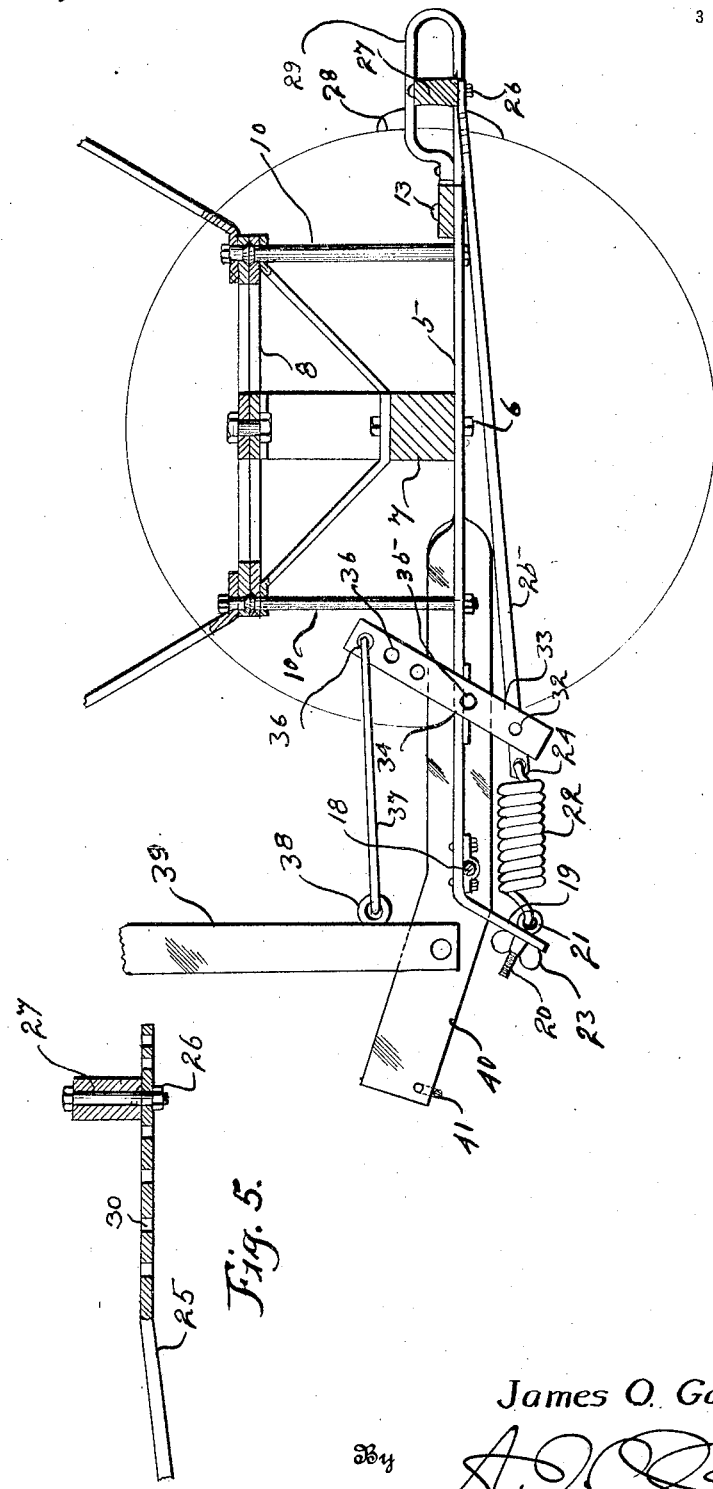
Inventor
James O. Garrett

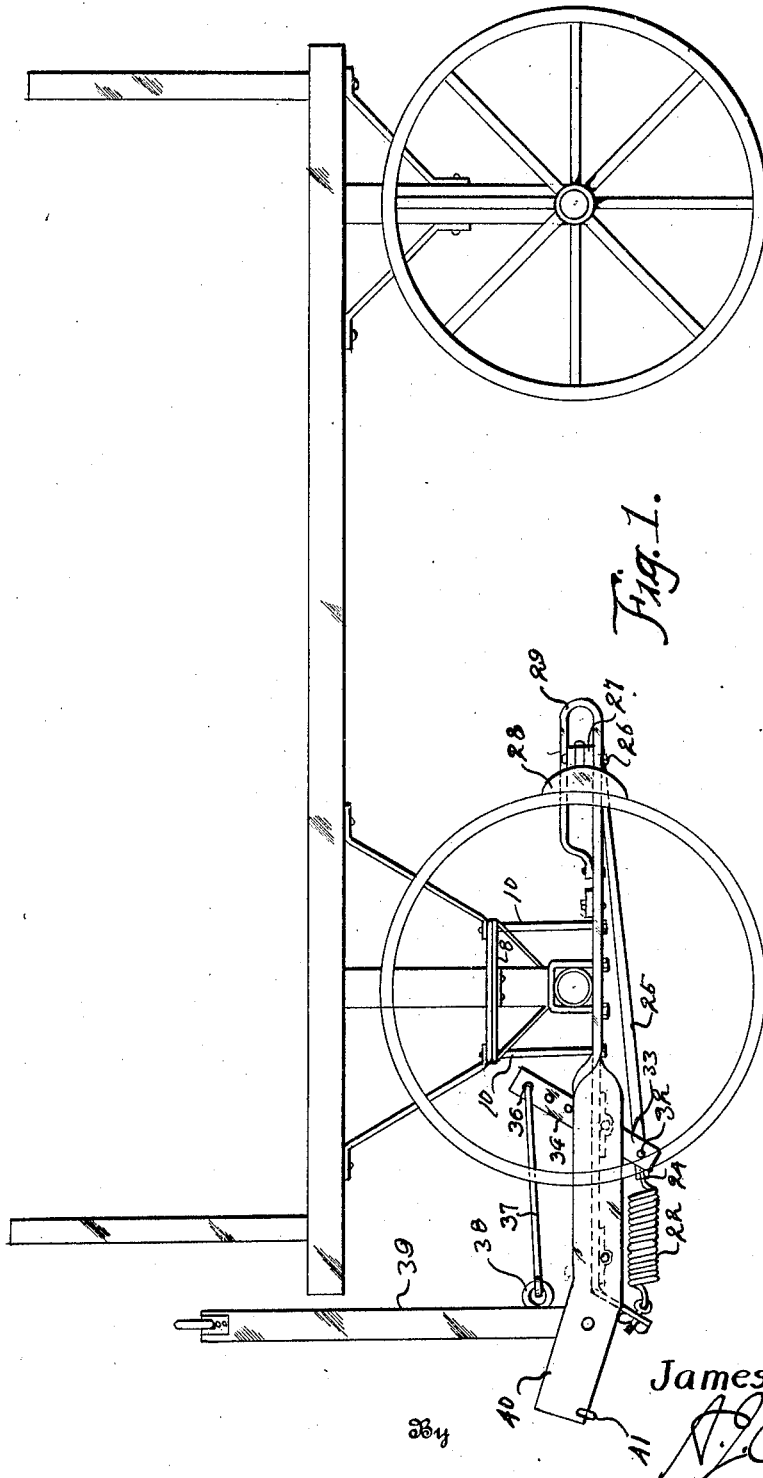

UNITED STATES PATENT OFFICE.

JAMES O. GARRETT, OF DENVER, COLORADO.

TRUCK-BRAKE.

1,393,013.  Specification of Letters Patent.  Patented Oct. 11, 1921.

Application filed July 3, 1919. Serial No. 308,564.

*To all whom it may concern:*

Be it known that I, JAMES O. GARRETT, a citizen of the United States, residing at the city and county of Denver and State of Colorado, have invented certain new and useful Improvements in Truck-Brakes; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in brakes more especially adapted for use with depot trucks, or trucks used at railway stations. It is important, in trucks of this character, that the brake shall be automatically applied as soon as the truck is left alone; otherwise the truck is liable to move from its position on the platform to a position on the railway tracks, resulting in collisions. This may be due either to a high wind or to the fact that the platform is somewhat inclined where the truck is located.

My object is to provide a device of this character which shall be exceedingly simple in construction, economical in cost and adapted to be quickly and easily applied to any truck now in use, or at least, any truck of ordinary construction.

My improvement consists of a central bar, rigidly connected with the axle and extending both forwardly and rearwardly therefrom, its forward extremity being connected with the forward ends of the hounds. This bar is connected with the fifth wheel by means of bolts diametrically positioned in front and rear of the axle. Beneath this central bar is a movable rod, the rear extremity of which is connected with a brake bar in the rear of the axle, while its forward extremity is connected forward of the axle with one end of a spiral spring, the opposite end of the spring being connected with a stationary forward part of the vehicle below the forward end of the hounds. The spring is normally under tension to hold brake shoes carried at the opposite extremities of the brake bar in contact with the front wheels in the rear of the axle. The tongue is connected by means of a rod or link with the upper extremity of a lever, which is fulcrumed on the central bar forward of the axle, the lower end of the lever being connected with the forward portion of a movable rod which operates the brake bar. The tension of the spring, acting on the lever, normally holds the tongue in the upright position, corresponding with the position of the brake bar when the brake shoes are applied to the wheels.

Having briefly outlined my improvement, I will proceed to describe the same in detail, reference being made to the accompanying drawing in which is illustrated an embodiment thereof. In this drawing:

Figure 1 is a side elevation of a truck equipped with my improved brake mechanism, the latter being shown in the brake-setting position.

Fig. 2 is a view of the forward portion of the truck with the brake shoes released and the tongue in position for moving the truck.

Fig. 3 is a top plan view with the platform removed in order to better show the parts beneath.

Fig. 4 is a section taken on the line 4—4, Fig. 3, the parts being shown on a larger scale.

Fig. 5 is a detail view partly in section showing the adjustability of the brake bar on the reciprocable rod.

The same reference characters indicate the same parts in all the views.

Let the numeral 5 designate the central bar, which is secured to the axle 7, as shown at 6. This bar is connected with the fifth wheel 8 by means of bolts 10, whose upper extremities are countersunk in the fifth wheel, while their lower extremities are connected with the bar 5 by means of nuts. The rear end of this central bar engages from below a transverse bar 12, whose opposite extremities are secured, as shown at 13, to parallel extensions 14 of the hounds 15. These hound extensions are connected with the axle by U-bolts 16, their forward extremities being connected by a bolt 18, which holds the forward end of the central bar in place. Beyond the bolt 18, this bar extends downwardly, as shown at 19, and carries an eye-bolt 20, which is connected as shown at 21 with the forward extremity of a spring 22. A wing nut 23 is applied to this eye-bolt and serves to regulate the tension of the spring. The rear end 24 of this spring is connected with the forward end of a rod 25, whose rear end is connected, as shown at 26, with the brake bar 27, to the opposite extremities of which brake shoes 28 are applied. The opposite end portions of the brake bar pass through and are guided by loops 29, formed at the rear ends of the hound extensions 14, and beyond the transverse bar 12. The rear portion of the rod 25 is provided with a number of perforations 30, through any one of which the pin 26, which connects the brake bar with the rod, may be passed. By means of these perforations the brake bar is adjustably connected with the rod, whereby the brake mechanism is adapted to be employed with trucks having wheels of varying sizes.

The forward portion of the rod 25, just in the rear of the spring 22, is pivotally connected as shown at 32 with the lower arm 33 of a lever 34, which is fulcrumed on the bar 5, as shown at 35, the upper extremity of the lever being connected as shown at 36 with the rear extremity of a rod or link 37, the forward end of the latter being connected as shown at 38 with the lower portion of the tongue 39.

From the foregoing description, the use and operation of my improved truck brake will be readily understood.

When the mechanism is in the position shown in Fig. 4, the tongue is raised and the brake shoes are in braking contact with the front wheels in the rear of the axle. Now, when it is desired to move the truck, the tongue is moved downwardly to the position shown in Fig. 2, and this movement acts upon the rod 25 through the medium of the link 37, and the lever 34, to disengage the brake shoes from the wheels, as clearly shown in Fig. 2.

It will be understood that the movement of the lever 34 from the position shown in Fig. 4, to that shown in Fig. 2, will place the spring 22 under tension; hence, as soon as the tongue is released, the recoil of the spring will return the tongue to the upright position and at the same time actuate the brake bar to bring the shoes again into braking relation with the wheels.

The forward, parallel portions 40 of the hounds 15 are inclined upwardly slightly as they extend forwardly, and the lower portions of their forward extremities are connected with a U-member 41, to prevent the downward movement of the tongue farther than is desired.

The upper arm of the lever 34 is provided with a number of perforations 36, whereby the rear end of the link or rod 37 may be adjusted to increase or diminish the throw of the lever during the operation of the tongue and during the operation of releasing and setting the brakes.

It should be explained that, by virtue of the fact that the brake shoes engage the front wheels of the vehicle in the rear of the axle, while the mechanism for supporting the tongue, including the spring element, is arranged forward of the axle, and whereby the brake mechanism is approximately equally distributed so far as weight is concerned, on opposite sides of the axle in front and rear, the mechanism is well balanced, and when the brakes are applied there is an absence of any tendency to tip the truck forwardly, which tendency exists in those structures where the brake mechanism is practically all forward of the axle.

I claim:

1. In brake mechanism of the class described, the combination of a reciprocable member, a brake bar connected with said member, a spring connecting the member with the vehicle, a pivoted tongue, a lever fulcrumed on a stationary part of the vehicle, one arm of the lever being pivotally connected with the member while the other arm is operatively connected with the tongue to normally support the latter in the raised position.

2. In brake mechanism for vehicles, the combination with a centrally located, longitudinally disposed bar, connected with the axle and extending both forwardly and rearwardly therefrom, means for connecting said bar with the fifth wheel at points both in front and rear of the axle, a reciprocable rod arranged below the said bar and approximately parallel therewith, a brake bar connected with the rear portion of said rod, a spring connecting the forward portion of the rod with a stationary part of the vehicle, a lever fulcrumed intermediate its extremities on said first named bar, one arm of the lever being pivotally connected with the rod, a tongue pivotally connected with the vehicle, and an operative connection between said tongue and the opposite arm of said lever, whereby the tongue is normally maintained in the raised position.

3. In brake mechanism of the class described, the combination of a longitudinally disposed, reciprocable member, a brake bar connected with said member, means for adjusting the bar on the member to adapt the mechanism to wheels of varying sizes, a spring connecting said member with a stationary part of the vehicle, a pivoted tongue, a lever fulcrumed on the vehicle, one arm of the lever being pivotally connected with the said member, while the other arm is operatively connected with the tongue to normally support the latter in the raised position.

4. In mechanism of the class described, the combination of a reciprocable member, a brake bar adjustably connected with said member, a spring connecting the member with a stationary part of the vehicle, means for adjusting the tension of the spring, a pivoted tongue, a lever fulcrumed on the vehicle, one of its arms being pivotally connected with the said member while the other arm is adjustably connected with the tongue.

5. In a brake of the class described, the combination of a reciprocable member extending both forwardly and rearwardly from the axle, a brake bar connected with the rear extremity of the member, a spring located forward of the axle and connected with a stationary part of the vehicle, a lever fulcrumed on a stationary part of the vehicle and connected at one extremity with said member forward of the axle, and an operative connection between the opposite extremity of the lever and the tongue for lifting the latter as the braking force is exerted on the said bar.

In testimony whereof I affix my signature.

JAMES O. GARRETT.